(12) United States Patent
Nitzan et al.

(10) Patent No.: US 7,491,465 B2
(45) Date of Patent: Feb. 17, 2009

(54) METHOD OF MAKING A THIN LAYER ELECTROCHEMICAL CELL WITH SELF-FORMED SEPARATOR

(75) Inventors: Zvi Nitzan, Zofit (IL); Shalom Luski, Rehovot (IL); Ehud Shchori, Rehovot (IL); Dalia Jayes, Modiin (IL)

(73) Assignee: Power Paper, Ltd., Petah Tivka (IL)

( * ) Notice: Subject to any disclaimer, the term of this patent is extended or adjusted under 35 U.S.C. 154(b) by 85 days.

(21) Appl. No.: 10/593,742

(22) PCT Filed: Mar. 23, 2005

(86) PCT No.: PCT/IL2005/000331

§ 371 (c)(1),
(2), (4) Date: Oct. 24, 2006

(87) PCT Pub. No.: WO2005/091405

PCT Pub. Date: Sep. 29, 2005

(65) Prior Publication Data

US 2007/0190406 A1    Aug. 16, 2007

Related U.S. Application Data

(63) Continuation-in-part of application No. 09/931,943, filed as application No. PCT/IL2005/000331 on Aug. 20, 2001.

(51) Int. Cl.
*H01M 2/14*     (2006.01)
*H01M 10/04*    (2006.01)

(52) U.S. Cl. .................. 429/142; 429/162; 29/623.1; 29/623.2

(58) Field of Classification Search ............... 29/623.1, 29/623.3; 429/142, 162
See application file for complete search history.

(56) References Cited

U.S. PATENT DOCUMENTS

| | | | | |
|---|---|---|---|---|
| 4,889,777 | A * | 12/1989 | Akuto | 429/163 |
| 5,219,673 | A * | 6/1993 | Kaun | 29/623.3 X |
| 5,664,321 | A * | 9/1997 | Sielemann et al. | 29/623.1 |
| 6,045,942 | A | 4/2000 | Miekka et al. | |
| 6,752,842 | B2 * | 6/2004 | Luski et al. | 29/623.3 |
| 7,022,431 | B2 * | 4/2006 | Shchori et al. | 29/623.1 X |
| 7,335,441 | B2 * | 2/2008 | Luski et al. | 29/623.1 X |
| 2003/0059673 | A1 | 3/2003 | Langan et al. | |
| 2003/0070283 | A1 | 4/2003 | Webber | |

FOREIGN PATENT DOCUMENTS

| WO | WO 98/56458 A | 12/1998 |
|---|---|---|
| WO | WO 00/62362 A | 10/2000 |
| WO | WO 03/017392 A | 2/2003 |

* cited by examiner

*Primary Examiner*—Stephen J. Kalafut
(74) *Attorney, Agent, or Firm*—Kenyon & Kenyon LLP

(57) ABSTRACT

A method of forming an electrochemical cell is disclosed. The method comprises contacting a negative pole layer and a positive pole layer one with the other or with an optional layer interposed therebetween. The pole layers and the optional layer therebetween are selected so as to self-form an interfacial separator layer between the pole layers upon such contacting.

17 Claims, 6 Drawing Sheets

METHOD OF MAKING A THIN LAYER ELECTROCHEMICAL CELL WITH SELF-FORMED SEPARATOR

This is a 371 national phase application of PCT/IL2005/000331 filed 23 Mar. 2005, claiming priority to U.S. patent application Ser. No. 10/806,192 filed 23 Mar. 2004 now U.S. Pat. No. 7,335,441, which is a continuation-in-part of U.S. patent application Ser. No. 09/931,943 filed 20 Aug. 2001, the contents of which are incorporated herein by reference.

FIELD OF THE INVENTION

The present invention relates to thin layer, liquid state electrochemical cells with, preferably, an open configuration that are used as battery power sources by converting chemical energy to electrical energy, and particularly to such a cell with a liquid electrolyte and self-formed porous separator layer between negative and positive pole layers.

BACKGROUND OF THE INVENTION

There are two broad classes of batteries: liquid state batteries, i.e., those with a liquid or wet electrolyte, and solid state batteries, i.e., those with an electrolyte in a solid state. Solid state batteries have advantages over liquid state batteries in that they inherently do not dry out and do not leak. However, they suffer major disadvantages when compared with liquid state batteries since, due to limited diffusion rates of charges through a solid, their operation is temperature dependent to a much larger extent, and many operate well only under elevated temperatures. Due to the limited diffusion rates, solid state batteries have a low ratio of electrical energy generated versus their potential chemical energy.

Liquid state, thin layer batteries typically include a positive and a negative active insoluble material layers put together with a porous separator layer interposed therebetween, which separator layer is soaked with a liquid electrolyte solution. Such batteries, examples of which are described in U.S. Pat. No. 4,623,598 to Waki et al., and in Japanese Patent Document JP 61-55866 to Fuminobu et al., have to be sealed within a sheathing film to prevent liquid evaporation, and are therefore closed electrochemical cells. Being closed cells, these batteries tend to swell upon storage due to evolution of gases. This is a fatal problem in thin layer batteries having no mechanical support, because the pressure imposed by the accumulated gases leads to separation of the layers, making the battery inoperative. Means to overcome this problem include: (i) the use of a polymer increased-viscosity agent, such as hydroxyethylcellulose, which bonds the battery layers together and serves as a mechanical support; and (ii) the addition of mercury to prevent the formation of gases, especially hydrogen. However, the polymer is limited in its effectiveness and the mercury is environmental hazardous.

Another solution to the problem of the evolution of gases in liquid state batteries is proposed in U.S. Pat. No. 3,901,732 to Kis et al., in which a gas-permeable, liquid-impermeable polymeric material is used as a sheathing film to enclose the battery cell. The polymeric material allows venting of undesirable gases formed within the battery while preventing any liquid loss from the battery.

A more direct and efficient approach to avoid undesired gas accumulation in liquid state thin layer batteries is disclosed in U.S. Pat. Nos. 5,652,043 and 5,897,522 to Nitzan, the disclosures of which are incorporated herein by reference. U.S. Pat. Nos. 5,652,043 and 5,897,522 disclose liquid state batteries constructed as open cells for facilitated release of gases, while at the same time are constructed to avoid liquid evaporation and drying out of the batteries. Such a construction enables production of thin layer batteries devoid of casings, which batteries are simpler, thinner, more flexible and cheaper for mass production.

Reference is now made to FIG. 1, which illustrates a basic configuration of the flexible, thin layer, open electrochemical cell of U.S. Pat. Nos. 5,652,043 and 5,897,522, referred to hereinbelow as cell 10.

Cell 10 includes a layer of an insoluble negative pole 14, a layer of an insoluble positive pole 16 and a layer of a porous separator 12 interposed therebetween. The layer of the separator allows ionic transfer of electrolyte between the pole layers. It is noted that throughout the specification herein, the negative pole is where oxidation occurs, whereas the positive pole is where reduction occurs.

Separator 12 typically includes a porous insoluble substance, such as, but not limited to, filter paper, plastic membrane, cellulose membrane, cloth, non-woven material (e.g., cotton fibers) and the like, and is soaked with the aqueous electrolyte solution. The electrolyte solution typically includes a deliquescent (and hygroscopic) material for keeping open cell 10 wet at all times, an electroactive soluble material for obtaining the required ionic conductivity and a water-soluble polymer for obtaining the required viscosity for adhering pole layers 14 and 16 to separator 12.

By being hygroscopic, the deliquescent material maintains open cell 10 moisturized at all times. The level of moisture within the cell may vary depending on the deliquescent material selection, its concentration and ambient humidity and temperature. Suitable deliquescent materials include, but are not limited to, calcium chloride, calcium bromide, lithium chloride, zinc chloride, potassium biphosphate, potassium acetate and combinations thereof.

The electroactive soluble material is selected in accordance with the materials of which the negative and positive pole layers are made. Examples of suitable electroactive soluble materials include zinc chloride and zinc bromide for various primary cells, and potassium hydroxide and sulfuric acid for rechargeable cells.

The water-soluble polymer is employed as an adhesive agent to bond pole layers 14 and 16 to separator 12. Many types of polymers are suitable for this purpose, such as, for example, polyvinyl alcohol (PVA), poly(acryl amide), poly (acrylic acid), poly(vinyl pyrrolidone) (PVP), polyethylene oxide, agar, starch, hydroxyethylcellulose and combinations and copolymers thereof.

In all of the embodiments of U.S. Pat. Nos. 5,652,043 and 5,897,522, the porous separator layer is formed or manufactured as a separate layer from the negative and positive pole layers. This, in turn, is limiting in the sense that (i) it calls for at least three manufacturing steps; and (ii) the contact between the layers is typically less than optimal.

SUMMARY OF THE INVENTION

In one aspect, the present invention seeks to provide improvements to the flexible, thin layer, open liquid state electrochemical cells disclosed in U.S. Pat. Nos. 5,652,043 and 5,897,522. In the present invention, and in contrast with the prior art, the step of manufacturing a separator layer to be interposed between the pole layers is devoid. Rather, ingredient solutions, which include electroactive soluble materials and, optionally and preferably, a deliquescent material and a water-soluble polymer, are selected so that an interfacial layer of a porous separator is self-formed between the pole layers upon an interaction between selected ingredients in the negative and positive pole layers or, optionally, upon an interaction of both pole layers with an optional intermediate layer. The cell thus formed is preferably sufficiently deliquescent for keeping the pole layers substantially wet at all times, and sufficiently electroactive for obtaining ionic conductivity between the pole layers.

The interaction that forms the interfacial separator layer may be of several alternative types. Thus, there may be a physical interaction or chemical reaction between the pole layers or the pole layers and the optional layer disposed therebetween, which results in the formation of a gel or a precipitate between the pole layers, which gel or precipitate serves as a porous separator soaked with a liquid electrolyte. In some embodiments, the porous separator can be a membrane such as a polymeric membrane, which includes, but is not limited to any suitable membrane, solid membrane, gelled membrane or gelled precipitate or a combination thereof.

According to one aspect of the present invention there is provided a method of forming an electrochemical cell, the method comprising contacting a negative pole layer and a positive pole layer one with the other or with, an optional layer interposed therebetween, the pole layers and the optional layer being selected so as to self-form an interfacial separator layer between the pole layers upon the contacting.

According to another aspect of the present invention there is provided an electrochemical cell comprising a negative pole layer, a positive pole layer and an interfacial separator layer interposed therebetween, the negative pole layer and the positive pole layer are selected so as to self-form the interfacial separator layer upon contacting one with the other or with an optional layer interposed therebetween.

According to further features in preferred embodiments of the invention described below, the pole layers and the optional layer are selected such that the electrochemical cell is sufficiently deliquescent for keeping the pole layers generally wet and sufficiently electroactive for obtaining ionic conductivity between the pole layers.

According to still further features in the described preferred embodiments the interfacial separator layer comprises a polymer precipitate or a gel.

According to still further features in the described preferred embodiments the interfacial separator layer self-forms via a physical interaction.

According to still further features in the described preferred embodiments the physical interaction results in a formation of a polymer precipitate or a gel between the pole layers.

According to still further features in the described preferred embodiments the interfacial separator layer self-forms via a chemical reaction.

According to still further features in the described preferred embodiments the chemical reaction results in a formation of a polymer precipitate or a gel between the pole layers.

According to still further features in the described preferred embodiments the interfacial separator layer self-forms via a physical interaction between at least one polymer and at least one polymer precipitating agent.

According to still further features in the described preferred embodiments the interfacial separator layer self-forms via a physical interaction between at least one polymer and at least one electrostatic cross-linking agent.

According to still further features in the described preferred embodiments the interfacial separator layer self-forms via a physical interaction between at least two polymers.

According to still further features in the described preferred embodiments the physical interaction between the at least two polymers is selected from the group consisting of an electrostatic interaction and a non-electrostatic interaction.

According to still further features in the described preferred embodiments the non-electrostatic interaction is selected from the group consisting of hydrogen bonding interaction and van-der-Waals interaction.

According to still further features in the described preferred embodiments the interfacial separator layer self-forms via a physical interaction between at least two polymers and at least one activator.

According to still further features in the described preferred embodiments the at least one activator is selected from the group consisting of zinc chloride and $H_3O^+$ ions.

According to still further features in the described preferred embodiments the interfacial separator layer self-forms via a chemical reaction between at least one polymerizable unit and at least one polymerization activator.

According to still further features in the described preferred embodiments at least one of the pole layers and the optional layer includes a material that is both deliquescent and electroactive, e.g., zinc chloride.

According to still further features in the described preferred embodiments the positive pole layer includes manganese dioxide powder and the negative pole layer includes zinc powder.

According to still further features in the described preferred embodiments the negative pole layer further includes carbon powder.

According to still further features in the described preferred embodiments the positive pole layer further includes carbon powder.

According to still further features in the described preferred embodiments the at least one polymer includes poly (vinyl pyrrolidone) (PVP).

According to still further features in the described preferred embodiments the at least one polymer precipitating agent includes zinc chloride.

According to still further features in the described preferred embodiments the at least one polymer includes at least one polysaccharide.

According to still further features in the described preferred embodiments the at least one polysaccharide includes chitosan.

According to still further features in the described preferred embodiments the at least one polysaccharide includes at least one carboxylated polysaccharide.

According to still further features in the described preferred embodiments the at least one polysaccharide includes sodium alginate.

According to still further features in the described preferred embodiments the at least one polysaccharide includes pectin.

According to still further features in the described preferred embodiments the at least one electrostatic cross-linking agent includes zinc chloride.

According to still further features in the described preferred embodiments at least one of the at least two polymers is poly(acrylic acid).

According to still further features in the described preferred embodiments at least one of the least two polymers is a polymer selected from the group consisting of PVP, poly (vinyl alcohol), poly(ethylene oxide) and poly(ethyl oxazoline) (PEOx).

According to still further features in the described preferred embodiments at least one terminal is provided in electrical contact with at least one of the pole layers, applied via a printing technology and made of a metal such as, but not limited to, iron, nickel, titanium, copper, stainless steel and mixtures thereof.

In accordance with a preferred embodiment of the present invention the cell further includes at least one externally located adhesive backing.

In accordance with another preferred embodiment of the present invention the cell further includes at least one externally located protective layer.

According to another aspect of the present invention there is provided a method of forming an electrochemical cell, the method including (a) forming a positive pole layer, comprising the steps of: (i) printing a layer of positive pole powder onto a first substrate; and (ii) printing a layer of electrolyte on the layer of positive pole powder, wherein the electrolyte includes a self-forming separator layer ingredient; (b) forming a negative pole layer, comprising the steps of: (i) printing a layer of negative pole powder onto a second substrate; and (ii) printing a layer of electrolyte on the layer of negative pole powder, wherein the electrolyte includes a self-forming separator layer ingredient; and (c) contacting the first substrate and the second substrate readily facilitating interaction between the self-forming separator layer ingredients in the positive pole layer and the negative pole layer to self-form an interfacial separator layer between the negative pole layer and the positive pole layer.

According to still further features in the described preferred embodiments the method further includes the step of printing an ink prior to step (a) onto at least one of inner sides of first and second substrates, the ink being a current conductor.

According to still further features in the described preferred embodiment the method further comprises the step of printing a sealing ingredient, wherein the sealant ingredient is printed onto the substrate of one of the group consisting of the positive pole layer, negative pole layer and positive pole layer and negative pole layer.

According to still further features in the described preferred embodiment the sealing ingredient is selected from, the group consisting of a glue, pressure sensitive glue, heat sensitive glue, an adhesive, a melting material, an ultrasonic welding material, hot melt polymer and combination thereof.

According to a further aspect of the present invention there is provided a method of forming an electrochemical cell, the method including (a) forming positive pole layer, including the steps of (i) printing a layer of positive pole powder onto a first substrate; and (ii) printing a layer of electrolyte on the layer of positive pole powder, wherein the electrolyte includes a self-forming separator layer ingredient; (b) forming negative pole layer including the steps of (i) printing a layer of negative pole powder onto a second substrate, and (ii) printing a layer of electrolyte on the layer of negative pole powder, wherein the electrolyte includes a self-forming separator layer ingredient; and (c) contacting the first substrate and the second substrate with a thin layer interposed between the positive pole layer and the negative pole layer, wherein the thin layer includes a self-forming separator layer ingredient, readily facilitating interaction between the self-forming separator layer ingredients in the positive pole layer and the negative pole layer with the self-forming separator layer ingredient in the thin layer to self-form an interfacial separator layer between the: negative pole layer and the positive pole layer.

According to still further features in the described preferred embodiments the thin layer is disposed on the positive pole layer and then the negative pole layer is applied onto the thin layer.

According to still further features in the described preferred embodiments the positive pole layer and the negative pole layer are applied simultaneously onto the thin layer.

According to still further features in the described preferred embodiments the application is by a printing technique.

According to still further features in the described preferred embodiment the method further comprises the step of printing a sealing ingredient, wherein the sealing ingredient is printed onto the substrate of one of the group consisting of the positive pole layer, negative pole layer and positive pole layers and negative pole layer.

According to still further features in the described preferred embodiment the sealing ingredient is selected from the group consisting of a glue, pressure sensitive glue, heat sensitive glue, an adhesive, a melting material, an ultrasonic welding material, hot melt polymer and combination thereof.

According to still further features in the described preferred embodiments the thin layer is a solution.

According to still further features in the described preferred embodiment the interfacial separator layer is formed as one of the group selected from a gel, a polymer precipitate, a membrane, a polymeric membrane, a solid membrane, a gelled membrane, a gelled precipitate or a combination thereof.

According to a further aspect of the present invention there is provided a method of forming an electrochemical cell, the method including: (a) forming positive pole layer, including the steps of: (i) applying a layer of positive pole powder onto a first substrate; and (ii) applying a layer of electrolyte on the layer of positive pole powder, wherein the electrolyte comprises a self-forming separator layer ingredient; (b) forming negative pole layer, including the steps of: (i) applying a layer of negative pole powder onto a second substrate; and (ii) applying a layer of electrolyte on the layer of negative pole powder, wherein the electrolyte comprises a self-forming separator layer ingredient; and (c) contacting the first substrate and the second substrate readily facilitating interaction between the self-forming separator layer ingredients in the positive pole layer and the negative pole layer to self-form an interfacial separator layer between the negative pole layer and the positive pole layer.

According to still further features in the described preferred embodiment applying is done by a technique selected from the group consisting of printing, spraying, coating and dispensing and a combination thereof.

According to still further features in the described preferred embodiment the interfacial separator layer is formed as one of the group selected from a gel, a polymer precipitate, a membrane, a polymeric membrane, a solid membrane, a gelled membrane, a gelled precipitate or a combination thereof.

According to yet another aspect of the present invention there is provided a method of forming an electrochemical cell, the method including: (a) forming positive pole layer, including the steps of: (i) applying a layer of positive pole powder onto a first substrate; and (ii) applying a layer of electrolyte on the layer of positive pole powder, wherein the electrolyte comprises a self-forming separator layer ingredient; (b) forming negative pole layer, including the steps of: (i) applying a layer of negative pole powder onto a second substrate; and (ii) applying a layer of electrolyte on the layer of negative pole powder, wherein the electrolyte comprises a self-forming separator layer ingredient; and (c) contacting the first substrate and the second substrate with a thin layer interposed between the positive pole layer and the negative pole layer, wherein the thin layer comprises a self-forming separator layer ingredient, readily facilitating interaction between the self-forming separator layer ingredients in the positive pole layer and the negative pole layer with the self-forming separator layer ingredient in the thin layer to self-form an interfacial separator layer between the negative pole layer and the positive pole layer.

According to still further features in the described preferred embodiment applying is done by a technique selected from the group consisting of printing, spraying, coating and dispensing and a combination thereof.

According to still further features in the described preferred embodiment the interfacial separator layer is formed as one of the group selected from a gel, a polymer precipitate, a polymeric membrane, a solid membrane, a gelled membrane, a gelled precipitate or a combination thereof.

According to a further aspect of the present invention there is provided a fully printed cell including: (a) a positive pole layer, including: (i) a layer of positive pole printed on a first substrate; and (ii) a layer of electrolyte printed on the layer of positive pole, wherein the electrolyte comprises a self-forming separator layer ingredient; (b) a negative pole layer, including: (i) a layer of negative pole printed onto a second substrate; and (ii) a layer of electrolyte printed on the layer of negative pole, wherein the electrolyte comprises a self-forming separator layer ingredient; and (c) a self-formed interfacial separator, wherein the self-formed interfacial separator is disposed between the negative pole layer and the positive pole layer.

According to still further features in the described preferred embodiment of the fully printed cell the self-formed separator is formed by contacting the first substrate and the second substrate readily facilitating interaction between the self-forming separator layer ingredients in the positive pole layer and the negative pole layer to self-form an interfacial separator layer between the negative pole layer and the positive pole layer.

According to still further features in the described preferred embodiment the fully printed cell further comprises at least one current conductor.

According to still further features in the described preferred embodiment the self-formed interfacial separator layer is formed as one of the group selected from a gel, a polymer precipitate, a membrane, a polymeric membrane, a solid membrane, a gelled membrane, a gelled precipitate or a combination thereof.

According to a further aspect of the present invention there is provided a method of forming a coplanar electrochemical cell, the method comprising: (a) applying a layer of positive pole powder onto a first substrate; (b) applying a layer of negative pole powder onto first substrate in spaced relation and in the same plane as the positive pole powder; (c) applying a layer of electrolyte between and on the layer of negative pole and positive pole, wherein the electrolyte comprises at least one self-forming separator layer ingredient; (d) applying a layer of electrolyte on a second substrate, wherein the electrolyte comprises at least one self-forming separator layer ingredient; (e) contacting the first substrate and the second substrate readily facilitating interaction between the self-forming separator layer ingredients in the first substrate and the second substrate layer to self-form an interfacial separator layer.

According to still further features in the described preferred embodiment the applying is done by a technique selected from the group consisting of printing, spraying, coating and dispensing and a combination thereof.

The term 'liquid state' as used herein shall include, but will not be limited to, a fully liquid state, a semi-liquid state, a viscous solution, a gel solution and any wet solution with different degrees of viscosity or a combination thereof.

The present invention successfully addresses the shortcomings of the presently known configurations by providing a cell in which a separator layer self-forms, thereby reducing the number of manufacturing steps and ensuring optimal contact between the separator layer and the pole layers.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENTS

Figure 1:
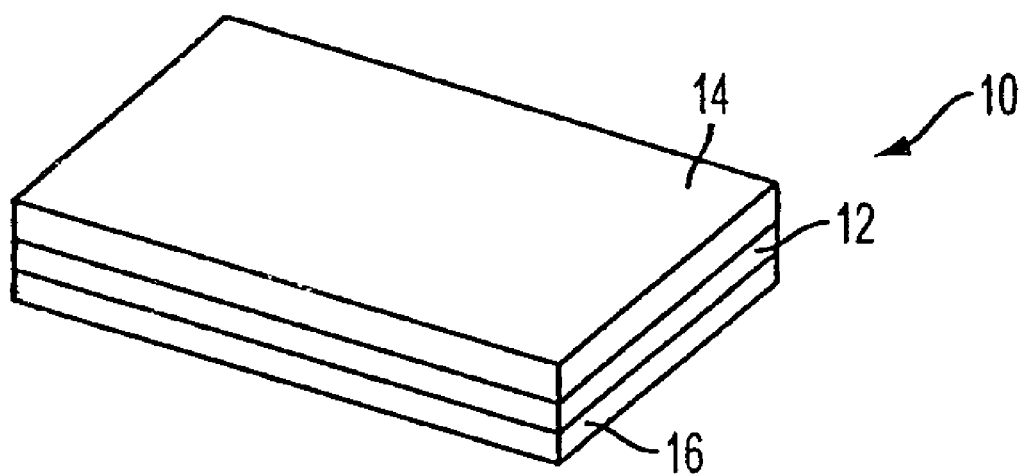
FIG. 1 is a simplified pictorial illustration of a basic configuration of a prior art, thin-layer open electrochemical cell.

The present invention is of thin layer, liquid state electrochemical cells that include self-formed separators and methods for their production.

The principles and operation of the electrochemical cell and the method according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways: Also, it is to be understood that the phraseology and terminology employed herein is for the purpose of description only and should not be regarded as limiting.

Figure 2:
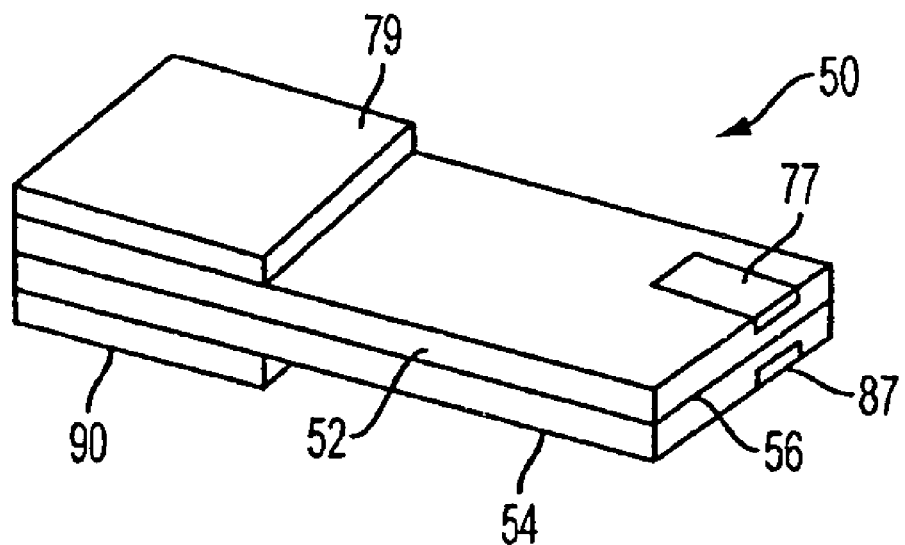
FIG. 2 is a simplified pictorial illustration of a thin layer open electrochemical cell, constructed and operative in accordance with a preferred embodiment of the present invention.

Reference is now made to FIG. 2, which illustrates a flexible, thin layer, open electrochemical cell 50, constructed and operative in accordance with a preferred embodiment of the present invention.

Cell 50 includes a negative pole layer 52 and a positive pole layer 54. Each of negative and positive pole layers 52 and 54 includes a mix of a suitable (negative or positive, respectively) active insoluble material with an aqueous electrolyte solution including an electroactive soluble material, and preferably also a deliquescent material and an adhesive polymer.

Suitable pairs of active powder materials to be used in the negative and positive pole layers, respectively, include, but are not limited to, manganese dioxide/zinc, silver oxide/zinc, cadmium/nickel oxide and iron/nickel oxide. The $MnO_2$ and AgO may be optionally mixed with a conductive carbon powder, as is known in the art.

A single material may function as both a deliquescent material and as the electroactive soluble material. Such a material should have suitable electroactive and hygroscopic characteristics. Suitable materials of this type include, but are not limited to, zinc chloride and zinc bromide. Preferably, the aqueous electrolyte solution includes $ZnCl_2$, which is highly hygroscopic and can therefore serve as a highly efficient deliquescent material, as well as the electroactive soluble material in cell 50.

A single material may function as a deliquescent material and as an adhesive polymer. Such a material should have suitable hygroscopic and adhesive characteristics. Suitable materials of this type include, but are not limited to, dextrane, dextrane sulfate, cellulose ethers such as methyl cellulose and hydroxyethylcellulose, polyvinylalcohol, poly(ethyl oxazoline) and combinations or copolymers thereof. However, since $ZnCl_2$ is highly hygroscopic, the use of thereof as the deliquescent material in the electrolyte solution is highly preferable over the described polymers, and therefore the polymer(s) are mainly aimed at providing adhesion of the pole layers to the self-formed separator.

The aqueous electrolyte solution in pole layers 52 and 54 further includes one or more water-soluble polymer(s) and, optionally, one or more polymerizing agent(s), which are selected such that an interfacial porous separator layer 56 self-forms as a result of an interaction therebetween upon contacting. Self-formed interfacial porous separator layer 56 is electrolyte-permeable and therefore allows ions transfer between pole layers 52 and 54.

Thus, according to the present invention, and in contrast with the prior art, separator 56 is not an independent layer interposed in a manufacturing process of cell 50 between pole layers 52 and 54, rather, it self-forms between pole layers 52 and 54, thus avoiding the need for introducing a separate separator between the pole layers in the cell and improving the contact between pole layers 52 and 54 and self-formed porous separator layer 56.

In an alternative, electrochemical cell 50 is formed using three layers, such that positive pole layer 54 and negative pole layer 52 are contacted with a thin layer interposed therebetween. The ingredients contained in the pole layers and the thin layer are selected such that interfacial separators self-form at both sides of the thin layer, and, as the reaction proceeds, integrate into a single, self-formed, interfacial separator layer 56 disposed between the pole layers 52 and 54. This approach has an advantage as it better allows to control the thickness of self-formed interfacial separator layer 56.

In both alternatives, however, the interfacial porous separator according to the present invention self-forms at an optimal place between the pole layers, has an optimal thickness and optimal intimate contact with the pole layers. As seen in FIG. 2, interfacial separator 56 is preferably formed only at the interface of pole layers 52 and 54, whereas the rest of pole layers 52 and 54 are substantially free of any interaction therebetween.

As will be described in length below, there are several approaches as to the method by which interfacial separator 56 self-forms. In preferred embodiments of the invention, however, deliquescent and/or adhesive polymers are used to self-form separator 56. Such deliquescent and/or adhesive polymers are deliquescently and/or adhesively most active when in solution. However, the adhesion and/or deliquescent properties of an electrolyte solution containing such polymers which also take part in the self-formation of separator layer 56 are not adversely affected as sufficient polymer molecules remain dissolved in the electrolyte solution, so as not to compromise the adhesion and/or deliquescent properties of the cell.

According to the present invention, the negative and positive pole layers may be formed by coating a pair of thin inert sheets or films, such as MYLAR® film, other PET (polyethylene terephthalate) film or polyester film, with the selected pole materials and electrolyte solutions. The two films are brought into contact with each other and an interfacial porous separator self-forms at the interface between the two pole layers.

Optionally, an additional thin aqueous layer, which includes one or more ingredients selected to interact with both positive and negative pole layers to self-form an interfacial separator, is interposed between the negative and positive pole layers. The three layers are brought into contact, so as to self-form interfacial separators at both sides of the thin layer, which integrates to a single interfacial separator layer self-formed between the pole layers at the end of the process, so as to provide a separator of thicker dimensions.

Thus, according to the present invention there is provided an electrochemical cell, including a negative pole layer, a positive pole layer and an interfacial separator layer interposed therebetween. Preferably, the negative pole layer ingredients and the positive pole layer ingredients are selected so as to self-form an interfacial separator layer upon contacting one with the other or with an optional layer interposed therebetween. Preferably, the electrochemical cell of the present invention is made by a printing method. Most preferably the electrochemical cell of the present invention is made by printing all the layers of the cell.

Preferably, the electrochemical cell with a self-formed separator is made as follows: First, an ink (current conductor) is applied onto inner sides of first and second substrates. Optionally, current conductor ink can be applied on the inner side of only one substrate. Suitable substrates include any suitable porous or non-porous material. Preferably, the substrate is a porous material. Preferably, substrate is a flexible material, such as, but not limited to paper and polyester. Preferably, a positive pole powder is applied on the ink of the first substrate and a negative pole powder is applied on the ink of the second substrate. Most preferably, the pole powders are applied onto the current conductor inks, after drying the current conductor ink. An electrolyte containing a deliquescent material, an electrosoluble material and a watersoluble polymer is then applied onto the layer of negative pole and onto the layer of positive pole. Preferably, the electrolyte is applied onto the layer of pole after drying the layers of pole powder. In such a way, a substrate with positive pole layers can be formed and a substrate with negative pole layers can be formed. Preferably, the positive pole layer and the negative pole layer include components (ingredients), which interact to self-form a separator layer between the negative and positive poles. More preferably, the electrolyte solution in the negative and positive pole layers include ingredients, which are selected such that an interfacial porous separator layer self-forms as a result of an interaction therebetween upon contacting. Preferably, the ingredients include one or more water-soluble polymer(s) and, optionally, one or more polymerizing agent(s). The first and second substrates are contacted with each other readily facilitating contact between components in the negative pole layer electrolyte and components in the positive pole layer electrolyte which interact, to self-form a separator and such that the inner sides of the first and second substrates face the self-formed separator, so that a three layer cell is formed. Preferably, at a suitable stage in the process, a sealing ingredient can be applied onto at least one of the pole substrates or onto both of the pole substrates. Preferably, the sealing ingredient is applied onto the perimeter of the substrate/s. Any suitable sealing ingredient can be used, such as but not limited to a glue, pressure sensitive glue, a heat sensitive glue, an adhesive, a melting material, an ultrasonic welding material, hot melt polymer or combination thereof. The sealing ingredient facilitates adhering and sealing together of the two pole substrates. In some embodiments, after the first and second substrate layers are joined together, high pressure can be applied to the regions with the sealant.

Applying can be done by any suitable technique such as, but not limited to printing, spraying, coating and dispensing or a combination thereof.

Most preferably, the electrochemical cell with a self-formed separator is made by a printing technique according to the following method. First, an ink (current conductor) is printed onto inner sides of first and second substrates. Optionally, current conductor ink can be printed on the inner side of only one substrate. Suitable substrates include any suitable porous or non-porous material. Preferably, the substrate is a porous material. Preferably, substrate is a flexible material, such as, but not limited to paper and polyester. Preferably, a positive pole powder is printed on the ink of the first substrate and a negative pole powder is printed on the ink of the second substrate. Most preferably, the pole powders are printed onto the current conductor inks, after drying the current conductor ink. An electrolyte containing a deliquescent material, an electrosoluble material and a watersoluble polymer is then printed onto the layer of negative pole and onto the layer of positive pole. Preferably, the electrolyte is printed onto the layers of pole after drying the layers of pole. In such a way, a substrate with positive pole layers can be formed and a substrate with negative pole layers can be formed. Preferably, the positive pole layer and the negative pole layer include components (ingredients), which interact to self-form a separator layer between the negative and positive poles. More preferably, the electrolyte solution in the negative and positive pole layers include ingredients, which are selected such that an interfacial porous separator layer self-forms as a result of an interaction therebetween upon contacting. Preferably, the ingredients include one or more water-soluble polymer(s) and, optionally, one or more polymerizing agent(s). The first and second substrates are contacted with each other readily facilitating contact between components in the negative pole layer electrolyte and components in the positive pole layer electrolyte which interact to self-form a separator and such that the inner sides of the first and second substrates face the self-formed separator, so that a three layer cell is formed. In some embodiments, at a suitable stage in the process, a sealing ingredient can be printed onto at least one of the pole substrates or onto both of the pole substrates. Preferably, the sealing ingredient is printed onto the perimeter of the substrates. Any suitable sealing ingredient can be used, such as but not limited to a glue, pressure sensitive glue, a heat sensitive glue, an adhesive, a melting material, an ultrasonic welding material, hot melt polymer or combination thereof. The sealing ingredient facilitates adhering and sealing together of the two pole substrates. In some embodiments, after the first and second substrate layers are joined together, high pressure can be applied to the regions with the sealant. This method can facilitate production of a substantially fully printed electrochemical cell.

Alternatively, the electrochemical cell with a self-formed separator can be made as follows: First, an ink (current conductor) is applied onto inner sides of first and second substrates. Optionally, current conductor ink can be applied on the inner side of only one substrate. Suitable substrates include any suitable porous or non-porous material. Preferably, the substrate is a porous material. Preferably, substrate is a flexible material, such as, but not limited to paper and polyester. Preferably, a positive pole powder is applied on the ink of the first substrate and a negative pole powder is applied on the ink of the second substrate. Most preferably, the pole powders are applied onto the current conductor inks, after drying the current conductor ink. An electrolyte containing a deliquescent material, an electrosoluble material and a water-soluble polymer is then applied onto the layer of negative pole powder and onto the layer of positive pole powder. Preferably, the electrolyte is applied onto the layers of pole after drying the layers of pole. In such a way a substrate with positive pole layers can be formed and a substrate with negative pole layers can be formed. Preferably, an optional thin layer is interposed between the negative and positive pole layers. Alternatively, the optional thin layer can be applied onto the positive pole electrolyte and subsequently the negative pole electrolyte layer, which is disposed on the negative pole and the second substrate can be applied onto the non-attached side of the optional thin layer. This embodiment is also possible wherein the optional thin layer is first applied onto the negative pole electrolyte. Preferably, the positive pole layer, the negative pole layer and the thin layer include components (ingredients), so that on contacting, the ingredients interact readily facilitating an interfacial separator self-forming at both sides of the thin layer and as the reaction proceeds integrates into a single, self-formed interfacial separator layer between the negative and positive pole layers. The first and second substrates are contacted with the optional thin layer readily facilitating formation of a self-formed interfacial separator layer between the negative pole layers and positive pole layers and such that the inner sides of the first and second substrates face the self-formed separator.

In some embodiments, at a suitable stage in the process, a sealing ingredient can be applied onto at least one of the pole substrates or onto both of the pole substrates. Preferably, the sealing ingredient is applied onto the perimeter of the substrates. Any suitable sealing ingredient can be used, such as but not limited to a glue, pressure sensitive glue, a heat sensitive glue, an adhesive, a melting material, an ultrasonic welding material, hot melt polymer or combination thereof. The sealing ingredient facilitates adhering and sealing together of the two pole substrates. In some embodiments, after the first and second substrate layers are joined together, high pressure can be applied to the regions with the sealant. Applying can be done by any suitable technique such as, but not limited to printing, spraying, coating and dispensing or a combination thereof.

Preferably, the electrochemical cell with a self-formed separator is made by a printing method as follows: In a first step an ink (current conductor) is printed onto inner sides of first and second substrates. Optionally, the current conductor ink can be printed on the inner side of only one substrate. Suitable substrates include any suitable porous or non-porous material. Preferably, the substrate is a porous material. Preferably, substrate is a flexible material, such as, but not limited to paper and polyester. Preferably, a positive pole powder is printed on the ink of the first substrate and a negative pole powder is printed on the ink of the second substrate. Most preferably, the pole powders are printed onto the current conductor inks, after drying the current conductor ink. An electrolyte containing a deliquescent material, an electrosoluble material and a watersoluble polymer is then printed onto the layer of negative pole powder and onto the layer of positive pole powder. Preferably, the electrolyte is printed onto the layer of pole after drying the layers of pole. In such a way, a substrate with positive pole layers can be formed and a substrate with negative pole layers can be formed. An optional thin layer is interposed between the negative and positive pole layers. Preferably, the positive pole layer, the negative pole layer and the thin layer include components (ingredients), so that on contacting, the ingredients interact readily facilitating an interfacial separator self-forming at both sides of the thin layer. Preferably, the first and second substrates are contacted with the optional thin layer. Optionally, the thin layer can be printed onto one of the pole layers and the second pole layer is then applied onto or contacted with the printed thin layer. Contact between the negative pole layers, positive pole layers and thin layer, readily facilitates formation of a self-formed interfacial separator layer between the negative pole layers and positive pole layers and as the reaction proceeds integrates into a single, self-formed interfacial separator layer between the negative and positive pole layers, such that the inner sides of the first and second substrates face the self-formed separator. In some embodiments, at a suitable stage in the process, a sealing ingredient can be printed onto at least one of the pole substrates or onto both of the pole substrates. Preferably, the sealing ingredient is printed onto the perimeter of the substrates. Any suitable sealing ingredient can be used, such as but not limited to a glue, pressure sensitive glue, a heat sensitive glue, an adhesive, a melting material, an ultrasonic welding material, hot melt polymer or combination thereof. The sealing ingredient facilitates adhering and sealing together of the two pole substrates. In some embodiments, after the first and second substrate layers are joined together, high pressure can be applied to the regions with the sealant.

Figure 4:
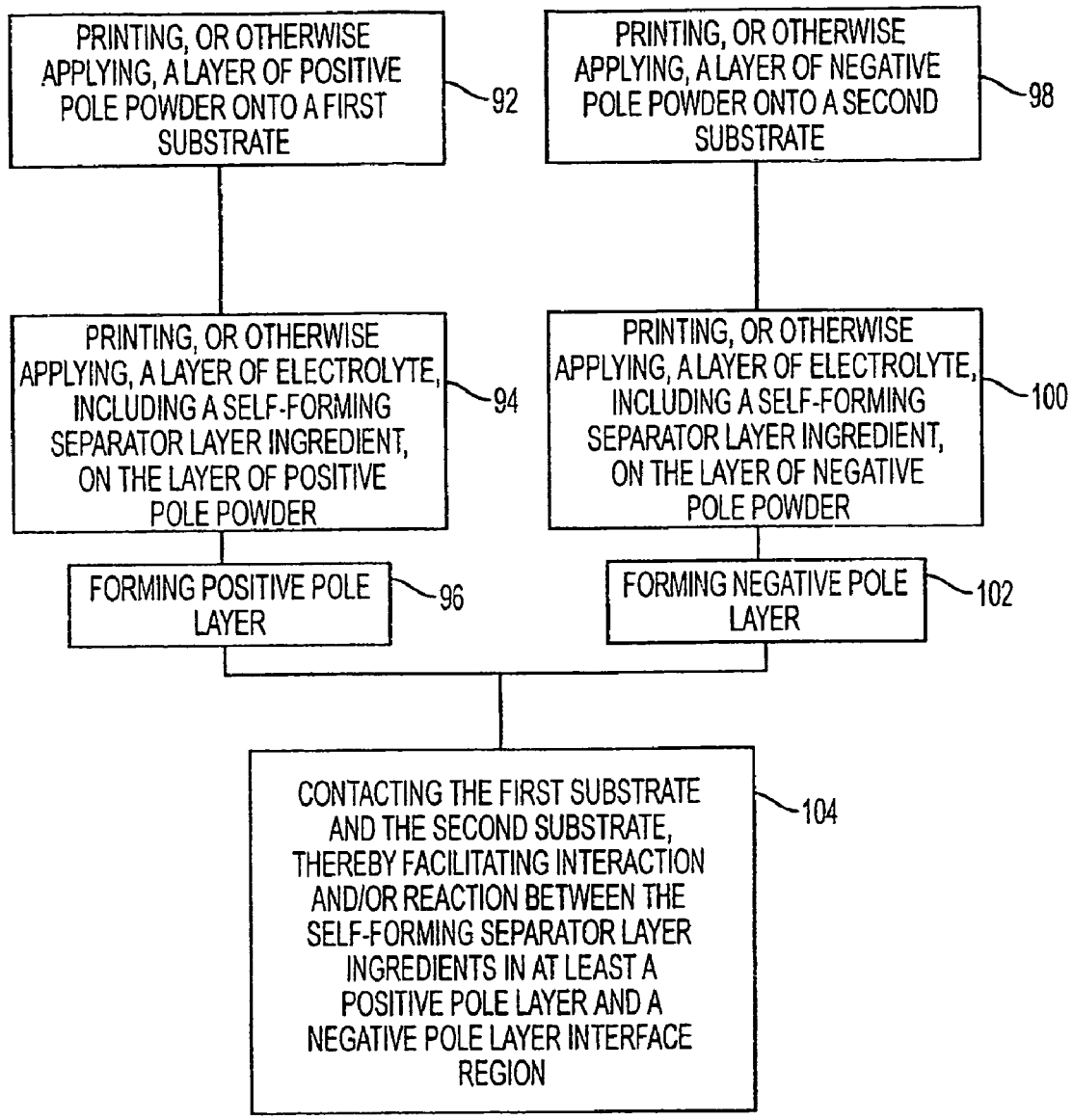
FIG. 4 is another simplified block diagram of methods for forming an electrochemical cell, in accordance with preferred embodiments of the present invention.

FIG. 4 is another simplified block diagram of methods for forming an electrochemical cell, in accordance with preferred embodiments of the present invention. The steps of the methods for forming include: at 92, printing, or otherwise applying, a layer of positive pole powder onto a first substrate; at 94, printing, or otherwise applying, a layer of electrolyte on the layer of positive pole powder, wherein the electrolyte includes a self-forming separator layer ingredient; the steps of 92 and 94 resulting in 96 forming of positive pole layer; at 98, printing, or otherwise applying, a layer of negative pole powder onto a second substrate; at 100, printing, or otherwise applying, a layer of electrolyte on the layer of negative pole powder, wherein the electrolyte includes a self-forming separator layer ingredient; the steps of 98 and 100 resulting in 102 forming of negative pole layer and at 104, contacting the first substrate and the second substrate, readily facilitating interaction and/or reaction between the self-forming separator layer ingredients in at least the positive pole layer and the negative pole layer interface region to self-form an interfacial separator layer between the negative pole layer and the positive-pole layer.

Figure 5:
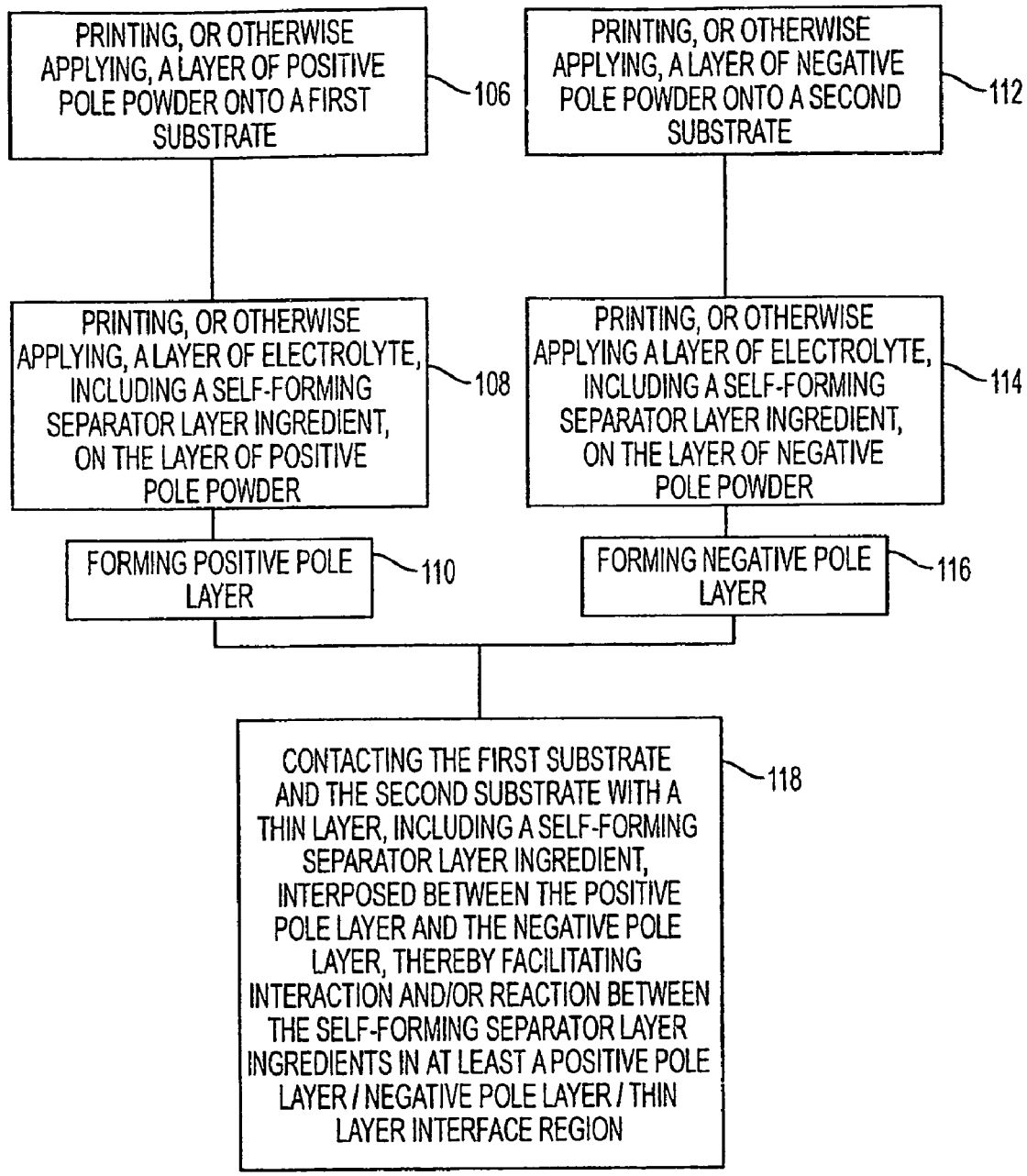
FIG. 5 is still another simplified block diagram of methods for forming an electrochemical cell, in accordance with preferred embodiments of the present invention.

FIG. 5 is still another simplified block diagram of methods for forming an electrochemical cell, in accordance with preferred embodiments of the present invention. The steps of the methods for forming include: at 106, printing, or otherwise applying, a layer of positive pole powder onto a first substrate; at 108, printing, or otherwise applying, a layer of electrolyte on the layer of positive pole powder, wherein the electrolyte includes a self-forming separator layer ingredient; the steps of 106 and 108 resulting in 110 forming of positive pole layer; at 112, printing, or otherwise applying, a layer of negative pole powder onto a second substrate; at 114, printing, or otherwise applying, a layer of electrolyte on the layer of negative pole powder, wherein the electrolyte includes a self-forming separator layer ingredient; the steps of 112 and 114 resulting in 116 forming of negative pole layer; and at 118, contacting the first substrate and the second substrate with a thin layer interposed between the positive pole layer and the negative pole layer, wherein the thin layer comprises a self-forming separator layer ingredient, readily facilitating interaction and/or reaction between the self-forming separator layer ingredients in at least a positive pole layer/negative pole layer/thin layer interface region to self-form an interfacial separator layer between the negative pole layer and said positive pole layer.

Figure 6:
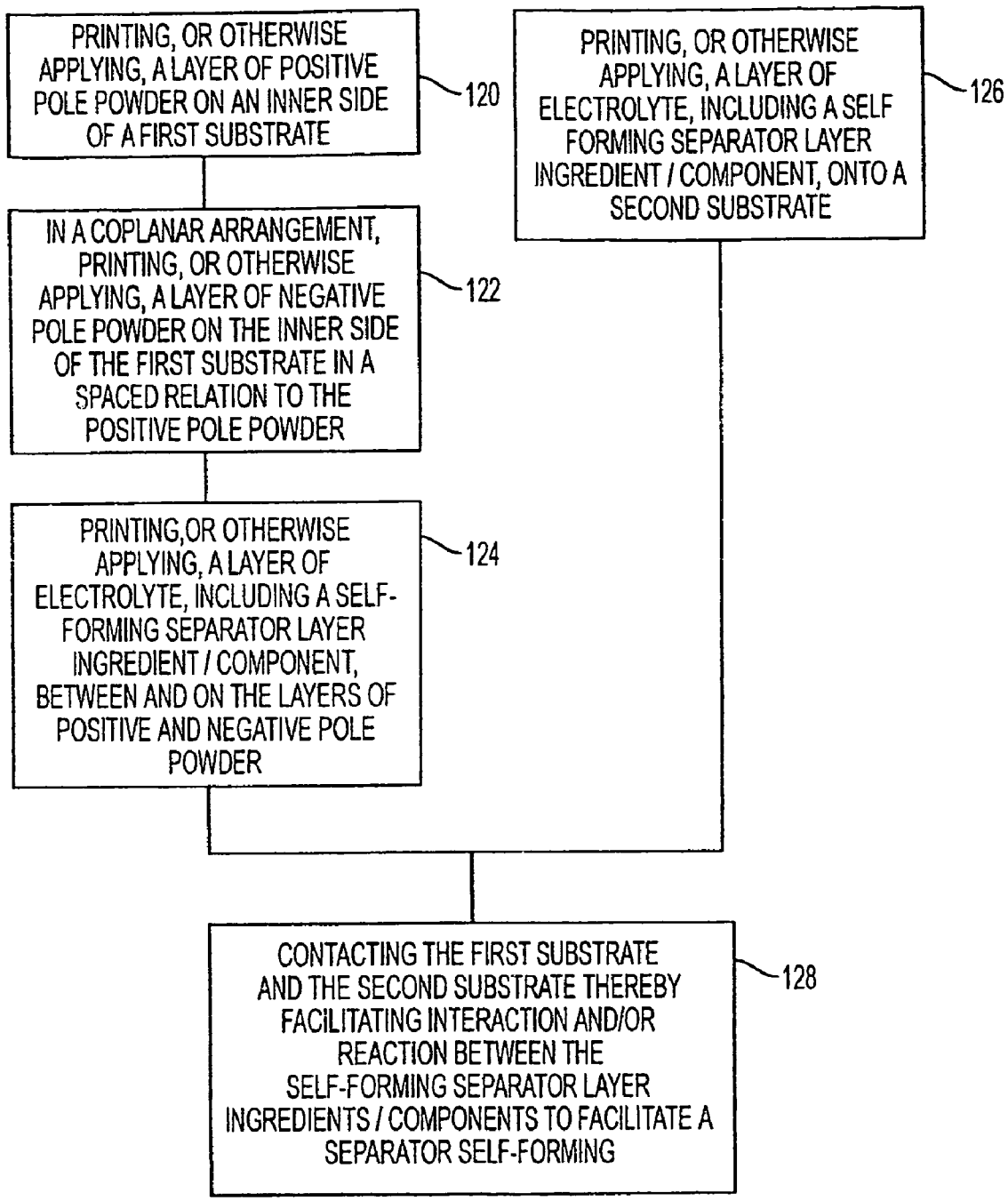
FIG. 6 is a simplified block diagram of a method for forming a coplanar electrochemical cell, in accordance with preferred embodiments of the present invention.

In an alternative embodiment, a cell with a coplanar arrangement of the poles and a self-forming separator can be made. FIG. 6 is a simplified block diagram of a method for forming a coplanar electrochemical cell, in accordance with preferred embodiments of the present invention. The cell can be made as follows: at 120, a positive pole powder is applied on the inner side of a first substrate. In a coplanar arrangement, at 122, a negative pole powder is applied on the same inner side of the substrate in spaced relation to the positive pole powder. Suitable substrates include any suitable porous or non-porous material. Preferably, the substrate is a porous material. Preferably, substrate is a flexible material, such as, but not limited to paper and polyester. At 124, an electrolyte is applied between and on the layer of negative pole and layer of positive pole, wherein the electrolyte includes a self-forming separator ingredient/component. Preferably, electrolyte can further include a deliquescent material, an electrosoluble material and a watersoluble polymer. Preferably, the electrolyte is applied between and on the layers of pole after drying the layers of pole. At 126, a second electrolyte layer including a self-forming separator ingredient/component is applied for example by printing onto a second substrate. At 128, on contacting the first substrate with the second substrate the self-forming separator ingredients interact and/or react readily facilitating a separator self-forming. In some embodiments, positive and negative current conductors are applied in the initial stage of forming the cell. In some embodiments, at a suitable stage in the process, a sealing ingredient can be printed onto at least one of the substrates or onto both of the substrates. Preferably, the sealing ingredient is printed onto the perimeter of the substrates. Any suitable sealing ingredient can be used, such as but not limited to a glue, pressure sensitive glue, a heat sensitive glue, an adhesive, a melting material, an ultrasonic welding material, hot melt polymer or combination thereof. The sealing ingredient facilitates adhering and sealing together of the two substrates. In some embodiments, after the first and second substrate layers are joined together, high pressure can be applied to the regions with the sealant. Applying can be done by any suitable technique such as, but not limited to printing, spraying, coating and dispensing or a combination thereof.

Figure 7A:
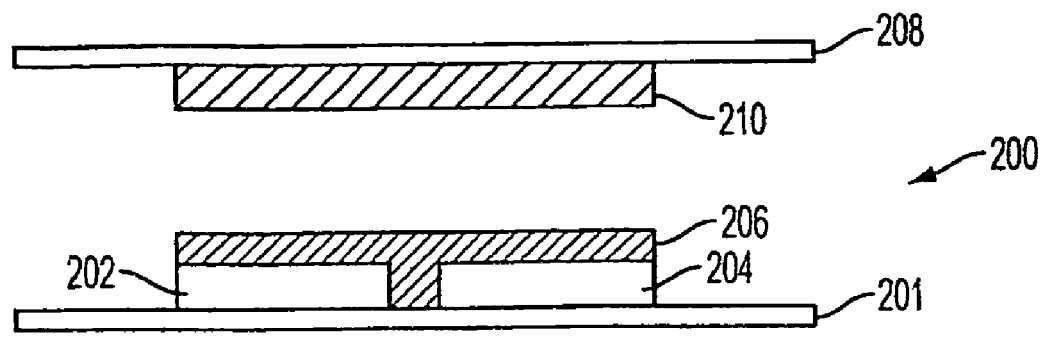
FIG. 7a is a schematic cross sectional view of the two substrate layers of a coplanar electrochemical cell, in accordance with preferred embodiments of the present invention.

FIG. 7a is a schematic cross sectional view of the two substrate layers of a coplanar electrochemical cell 200, in accordance with preferred embodiments of the present invention. As can be seen from FIG. 7, a first substrate layer 201 includes a layer of positive pole 202, a layer of negative pole 204 and a layer of electrolyte 206, in a coplanar arrangement. Preferably, layer of positive pole is disposed on substrate 202 in spaced relation to layer of negative pole 204, so that there is a separation between the two poles. Preferably, electrolyte 206 includes a self-forming separator ingredient/component. Preferably, electrolyte 206 is disposed on and between pole 202 and pole 204. Preferably, second substrate 208 includes a layer of electrolyte 210. Preferably, electrolyte 210 includes a self-forming separator ingredient/component. Electrolyte 210 can be disposed on second substrate 208 in any suitable way. Preferably, electrolyte 210 is disposed in a position, such that electrolyte 210 is in the same position and is parallel to electrolyte 206, when the two substrates are contacted together.

Figure 7B:
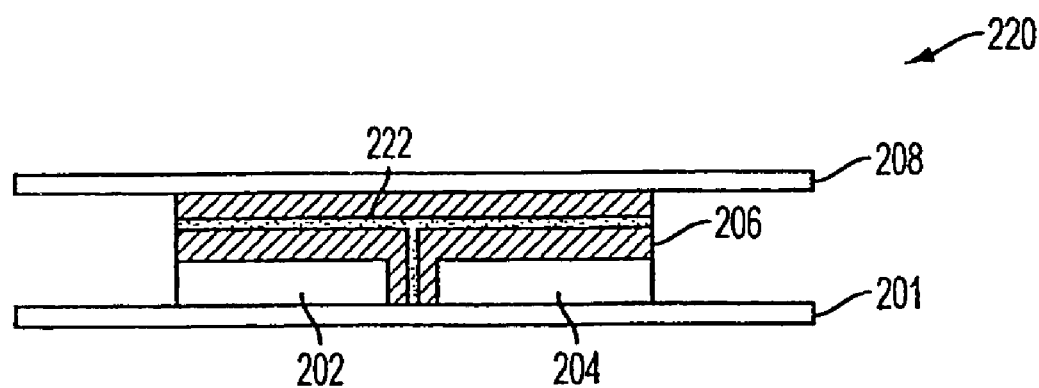
FIG. 7b is a schematic cross sectional view of a coplanar electrochemical cell, in accordance with preferred embodiments of the present invention.

FIG. 7b is a schematic cross sectional view of a coplanar electrochemical cell 220, in accordance with preferred embodiments of the present invention. As can be seen from FIG. 7b, coplanar electrochemical cell 220 with self-formed separator 222 includes a first substrate 201, a second substrate, 208, a positive pole 202, a negative pole 204 and a self formed separator 222. Contacting the two substrate layers, 201 and 208 of FIG. 7a, facilitates interaction and/or reaction between the self-forming separator ingredient/component/s in electrolyte 206 of first substrate and the self-forming separator ingredient/component/s in electrolyte 210 of second substrate facilitating formation of a self-forming separator 222.

The cell formed by the method of the present invention is preferably sufficiently deliquescent for keeping the pole layers substantially wet at all times, and sufficiently electroactive for obtaining ionic conductivity between the pole layers. These deliquescent and electroactivity properties of the cell may be obtained by using an aqueous electrolyte solution that includes $ZnCl_2$, as described hereinabove.

Figure 3:
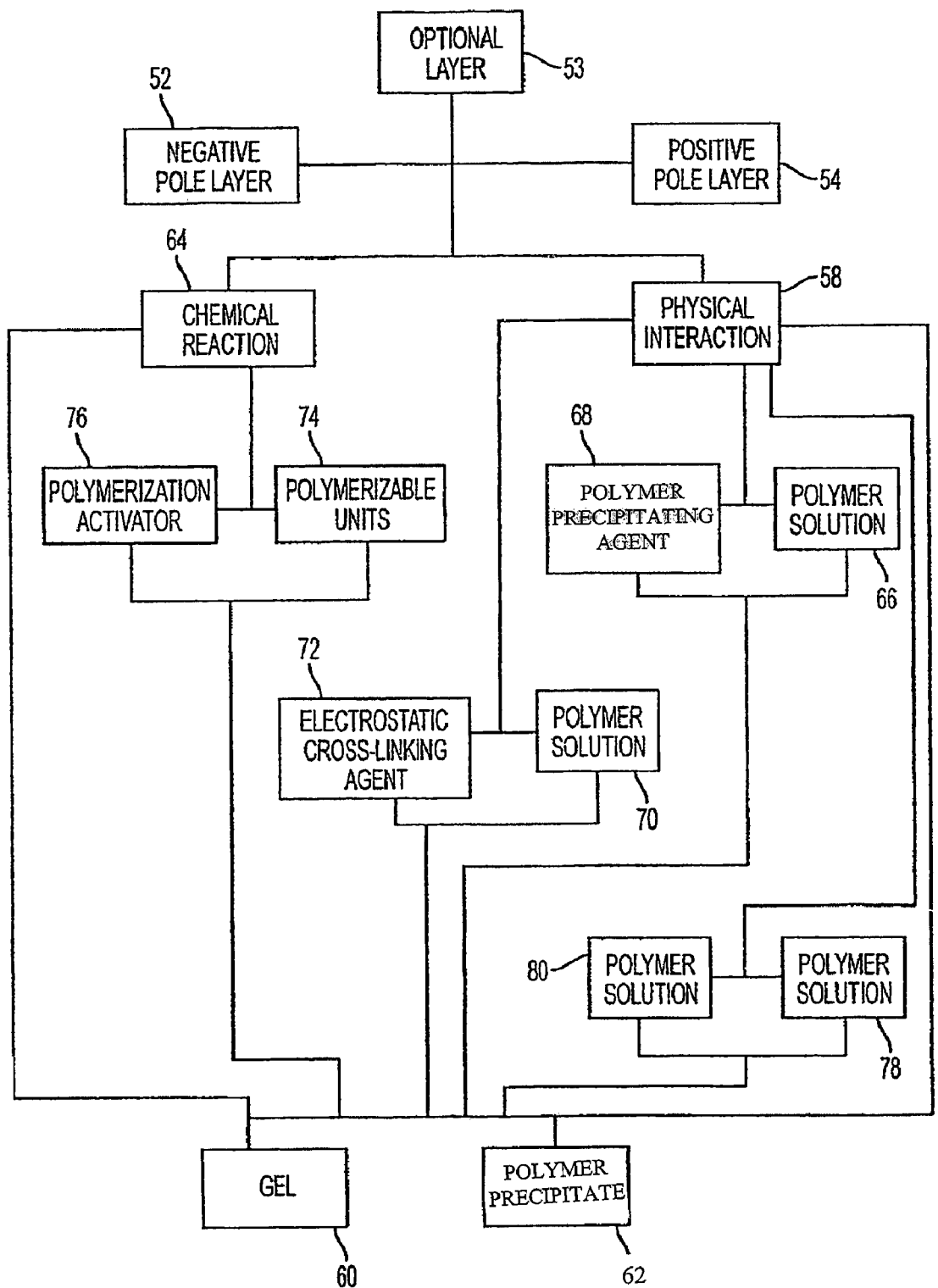
FIG. 3 is a simplified block diagram of methods for forming an electrochemical cell, in accordance with preferred embodiments of the present invention.

As is shown in FIG. 3, the solid interfacial separator layer self-forms either as a gel 60 or as a polymer precipitate 62. The term "gel" as used herein describes a more homogenous and typically somewhat transparent matrix. The phrase "polymer precipitate" as used herein describes a less-transparent matrix, which can be, for example, cloudy or opaque as it is less homogenous and ordered at the microscopic level. In some embodiments, the porous separator can be a membrane such as a polymeric membrane, which includes, but is not limited to any suitable membrane, solid membrane, gelled membrane or gelled precipitate or a combination thereof.

As is further shown in FIG. 3, the present invention employs several alternative types of interactions that are used to self-form the gel or polymer precipitate as the interfacial porous separator, and which are described in greater detail hereinbelow. These interactions involve, for example, precipitation of one or more polymers, co-precipitation of two or more polymers or polymerization of polymerizable units.

Thus, gel 60 or polymer precipitate 62 may be a coacervation formed by an interaction between the positive and negative pole layers with one another or with an additional thin layer. "Coacervation" is a term used herein to describe the phase separation of a polymer-rich phase from a macromolecular solution that occurs when the solubility is reduced by some chemical or physical means. Coacervation is often used in polymer science to describe the precipitation of polymers as a result of some specific interactions, normally interactions at interfaces.

The interaction between the layers, by which the interfacial separator layer is formed, can be categorized as either physical or chemical reaction.

Thus, as is further shown in FIG. 3, gel 60 or precipitate 62 self-forms between the negative and positive pole layers of the electrochemical cell as a result of a physical interaction 58 therebetween. Physical interaction 58, according to the present invention, involves a formation of gel 60 or polymer precipitate 62 as a result of non-covalent interactions between components present in the pole layers and, optionally, in the additional thin layer 53 such as, but not limited to, electrostatic interactions, hydrogen bonds interactions, van-der-Waals interactions or a combination thereof.

The formation of the interfacial separator as gel 60 or polymer precipitate 62 by physical interaction 58 can include, for example, precipitation of a polymer from polymer solution 66 by a polymer precipitating agent 68, an electrostatic cross-linking of a polymer from polymer solution 70 effected by a cross-linking agent 72 or a cross-linking of two or more polymers from polymer solution 78 and 80, which results in co-precipitation thereof.

According to a preferred embodiment of the present invention, the interfacial separator self-forms as a gel or a polymer precipitate as a result of a physical interaction between one or more layer(s) that include an aqueous solution of a polymer such as, but not limited to, PVP or chitosan, and one or more layers that include a polymer precipitating agent such as, but not limited to, a concentrated solution (e.g., 55%) of $ZnCl_2$.

According to another preferred embodiment, the interfacial separator self-forms as a gel or a polymer precipitate as a result of an electrostatic physical interaction between one or more layers that include an ionic polymer solution (e.g., a polysaccharide anionic solution such as sodium alginate) and one or more layers that include an electrostatic cross-linking agent 72 (e.g., $ZnCl_2$).

According to another preferred embodiment, the interfacial separator self-forms as a gel or a polymer precipitate as a result of an electrostatic physical interaction between one or more layers that include an ionic polymer in solution having a positive charge (e.g., cationic solution of a polymer) and one or more layers that include a polymer in solution having a negative charge (e.g., anionic solution of a polymer), in which case the interfacial separator self-forms as a co-precipitate of both polymers.

According to another preferred embodiment of the present invention, the interfacial separator self-forms as a gel or a polymer precipitate as a result of a cross-linking that involves hydrogen bonding between one or more layers that include a hydrogen-acceptor polymer in solution (e.g., a solution of PVP) and one or more layers that include a hydrogen-donor polymer in solution (e.g., a solution of poly(acrylic acid)), in which case the interfacial separator self-forms as a co-precipitate of both polymers.

As is further shown in FIG. 3, in the alternative, gel 60 or precipitate 62 self-forms between the negative and positive pole layers of the electrochemical cell as a result of a chemical reaction 64. Chemical reaction 64, according to the present invention, involves a formation of gel 60 or polymer precipitate 62 as a result of covalent interactions, which include the formation of new covalent bonds. Chemical reaction 64 can include, for example, polymerization of one or more polymerizable unit(s) 74, by a polymerization activator 76.

As used herein, the phrase "polymerizable units" includes chemical moieties capable of forming multiple unit macromolecules. The phrase "polymerizable units" reads on basic polymerizable units as well as polymerizable polymers capable of polymerizing into still larger polymers. The phrase "polymerization activator" reads on any chemical which induces polymerization of polymerizable units, either as a catalyst, a copolymerizing agent or a chemical cross-linker by catalysis or by virtue.

In one embodiment, the interfacial separator self-forms as a gel or a polymer precipitate as a result of a chemical reaction between one or more layers (52, 54 and optionally also 53, FIG. 3) that include one or more polymerizable units and one or more layers that include a polymerization activator which induces polymerization of the polymerizable units to a higher polymerization degree.

In another embodiment, one or more layers include a polymer solution of one or more polymerizable units (e.g., polyisocyanate) and one or more layers include another polymer solution of one or more polymerizable units (e.g., polyamine such as chitosan and polyethyleneimine or polyglycol such as poly(ethylene glycol) and polysaccharide), and the two soluble polymers chemically interact therebetween so as to produce a non-soluble co-polymer which forms the interfacial separator. Optionally, one of more layers may further include one or more polymerization activator(s) which induce the formation of the non-soluble co-polymer.

In another embodiment, one of more layers include an aqueous solution of one or more polymerizable units and one of more layers include a chemical activator that serves as a cross-linking agent (by induction or by virtue) and, optionally, another aqueous solution of one or more polymerizable units, in which case the interfacial separator self-forms as a result of a chemical cross-linking interaction.

Thus, the interfacial separator self-forms between the positive and negative pole layers by either physical interaction 58 or chemical reaction 64 as described hereinabove and is further detailed hereinbelow.

An example of a physical interaction in which a gel or a polymer precipitate is formed, is a precipitation interaction between zinc chloride, which acts as a deliquescent material, as an electroactive soluble material and as a precipitating agent, and an aqueous solution of PVP.

In preliminary experiments it was observed that PVP films do not dissolve in 55% zinc chloride and do not appreciably swell. It was therefore predicted that interacting a PVP solution with a concentrated solution of zinc chloride would result in the precipitation of PVP.

This prediction was reduced to practice by contacting a pair of inert films, as described hereinabove, coated with an electrolyte solution of zinc chloride (55%) and PVA (8%-12%) with an aqueous solution of 10% PVP K-90 (containing 2% saturated solution of methylene blue in ethanol as an indicator) that was placed therebetween. It was found that zinc chloride progressively diffused into the polymer solution of PVP, and a gel or a polymer precipitate formed rapidly at the interface of the layers as a very thin blue colored film. The gel or polymer precipitate formed in these experiments had a thickness in the range of 12-17 μm, but it is to be understood that these are only exemplary values, and the invention is by no means limited to these values. The gel or polymer precipitate was formed as a relatively hard solid matrix that could be integrally separated from the layered structure.

In other experiments that were conducted to demonstrate a formation of an interfacial solid layer by a precipitation interaction, a different technique was used. This technique involved a pair of inert films, such as MYLAR®, that was coated with a solution of 55% zinc chloride and 8-12% PVA, which were further coated with a thin layer of a PVP solution. The two films were contacted and the gel or polymer precipitate immediately formed therebetween.

In other experiments that involved precipitation interaction, an interfacial solution containing a mixture of PVP and PVA (poly(vinyl alcohol)) was employed and the two techniques described hereinabove were performed. The obtained results showed that increasing the PVA concentration in the interfacial solution resulted in the formation of a gel or polymer precipitate that is much porous than that obtained using PVP alone and is therefore softer and includes a larger amount of the electroactive zinc chloride solution therein.

These comparative experiments show that the mechanical properties and ionic conductivity of the obtained gel or polymer precipitate can be controlled by the ratio of polymers in the interfacial solution.

Another example of a physical precipitation interaction is an interaction between zinc chloride and chitosan. Chitosan is an amino functional polysaccharide, which can be found, for example, in the shell of insects and Crustacean such as crabs. Chemically, it is a polyglucose similar to cellulose except for the substitution of one hydroxyl group on each saccharide unit by an amino group. Chitosan is soluble in dilute acids such as 1% acetic acid.

A viscous solution (about 100 centipoise) of 1% chitosan (FLUKA, low molecular weight grade) in 1% acetic acid was prepared. A substrate such as of polyethylene terephthalate (PET) was coated with a solution of 8-12% PVA (poly(vinyl alcohol)) in 55% zinc chloride and the chitosan solution was applied thereon. The chitosan solution reacted with the zinc chloride solution so as to form a thin layer of a soft gel which has a dry touch.

A physical interaction that includes an electrostatic interaction between anionically charged polymers and zinc ions that forms ionically cross-linked polymers (gels) was also explored. Anionically charged polymers that may be suitable for such interaction are polymers bearing free carboxylic groups. An example of such a carboxylated polymer is sodium alginate, which is a naturally occurring polysaccharide found and extracted from algae and is commonly used in the food industry and dental laboratories. Sodium alginate is known as a water-soluble polymer that forms strong gels upon contact with multi-valent cations of elements such as calcium or zinc. Experiments showed that dropping a drop of 1-2% sodium alginate solution into dilute zinc chloride solution resulted in a spontaneous coacervation and a formation of a solid gel glob.

The unique feature of the alginate gel is the formation of a firm gel with a solid content of only 1-2%, which enables the formation of a separator that acts as a good mechanical barrier with a minimum sacrifice of conductivity.

Thus, it is shown herein that there may be a difference between the gel or polymer precipitate formed by an electrostatic cross-linking interaction as opposed to that formed by a precipitation interaction. The electrostatic cross-linking interaction can occur at low zinc ion concentrations and therefore the ionically cross-linked gel or polymer precipitate forms immediately upon contacting the zinc chloride solution even when relatively thick layers are used. Thus, the gel or polymer precipitate formation in this case occurs at early stages of the diffusion process, i.e., before the accumulation of high level of zinc ions at the interfacial layer. Contrary, the rate of formation of the gel or precipitate formed in the precipitation interaction, as in the example with PVP, was found to be time-dependent on the diffusion of zinc chloride into the PVP solution, as this interaction requires a build-up of high zinc chloride concentrations at the interfacial layer (e.g., higher than 17% for the precipitation interaction of PVP). Thus, the precipitation interaction is highly dependent upon the thickness of the layers.

Yet another example of a suitable polysaccharide for forming ionically cross-linked gel or polymer precipitate as the interfacial separator is pectin. Pectin is a polysaccharide of a complex nature. Pectin is known to exist as a variety of structures with a common feature of the presence of carboxylic groups, while some are in an ester form. The ratio between ester to free carboxylic acid is one of the differences between the varying structures of pectin. The gel or polymer precipitate formed with a 4% pectin solution, using the technique described hereinabove for alginate, was found to be softer and weaker as compared with the alginate gel or polymer precipitate.

The co-precipitation of two or more different polymers by a cross-linking interaction so as to form a gel or polymer precipitate as the interfacial separator was also explored. There are many examples of water-soluble polymers that form a gel upon mixing, as a result of an electrostatic cross-linking or non-electrostatic cross-linking. For example, poly (acrylic acid) (PAA), which is a hydrogen-donor polymer can interact, via hydrogen bonding, with a hydrogen-acceptor polymer such as, but not limited to, PVP, PVA, poly(ethylene oxide) and poly(ethyl oxazoline) (PEOx) in solution, so as to form a co-precipitation product.

Thus, in one example, a gel or polymer precipitate was formed by co-precipitation of a poly(vinyl pyrrolidone/acrylic acid) copolymer, also referred to herein as poly(VP/AA). This co-precipitation was achieved by preparing a solution of 0.71 grams of poly (VP/AA) where the ratio of PVP/PAA was 3/1, 6.0 grams of water and 0.60 grams (to achieve 25% acid neutralization) of KOH. The formed solution is hazy and contains about 10% polymer. The solution was spread over a substrate coated with an electrolyte solution of 55% zinc chloride and 8-12% PVA and a soft translucent wet gel was initially formed and became sticky as the interaction proceeded. A ratio of 3/1 PVP/PAA was needed in this case since at lower PVP concentrations (e.g., 1/1 PVP/PAA) the polymer was found soluble in 55% zinc chloride. The addition of KOH to the solution, which is aimed to partially neutralize the PAA, is recommended since it provides the formation of a thin film. By partially neutralizing the PAA, the hydrogen-bonding interaction between the two polymers in the polymer solution is avoided, and the polymers mixture is therefore soluble. Upon contacting the acidic electrolyte layer, the PAA regains its hydrogen-donor free carboxylic groups, and thereby interacts, via hydrogen bonds, with the PVP, so as to form a polymer coacervate. Thus, by physically interacting a PVP solution with a PAA solution that is partially neutralized, a cross-linking interaction that involves hydrogen bonds formation therebetween results in a co-precipitated product that can serve as an interfacial separator.

In another example, PAA was interacted via hydrogen bonding with poly(ethyl oxazoline) (PEOx). PEOx is a polymer that is very close to PVP. Both are tertiary amides that are structurally related to the polar aprotic solvents DMAC (N,N-dimethylacetamide) and NMP (N-methyl-2-pyrrolidone). PEOx, like PVP, forms a complex (as a polymer precipitate or gel) with PAA. As in the example described hereinabove, the PAA solution was partially neutralized in order to maintain the PAA soluble. Thus, a PAA solution was prepared by mixing 7.13 grams of 25% poly(acrylic acid) (MW 240,000) with 2.00 grams 25% sodium hydroxide to affect 50% acid neutralization. 2.57 grams of this solution were then mixed with 4.26 grams of 10% poly(ethyl oxazoline) (MW 500,000) solution, and the final solution was applied on a substrate coated with an electrolyte solution containing PVA and zinc chloride as described hereinabove. By contacting this acidic electrolyte solution, the partially neutralized PAA regained its hydrogen-donor free carboxylic groups, and thereby interacted, via hydrogen bonds, with the PEOx solution, so as to form the gel or polymer precipitate. The gel or polymer precipitate was formed at the interface as a thin, dry and rather rigid film. This film may be plasticized by the addition of PVA to the polymer mixture or by increasing the level of the PEOx in the polymer mixture, in order to form a softer, and thus more conductive interfacial separator.

The co-precipitation interaction of PAA and PEOx described hereinabove further demonstrates a co-precipitation physical interaction between polymeric solutions, which can include a physical interaction that results upon contacting other components in the electrolyte solution, such as zinc chloride or $H_3O^+$ ions that affect the pH of the solution. In this case, the gel or polymer precipitate is formed as a result of an interaction between a polymeric solution of mixed polymers and another layer that contains a co-precipitation activator as described.

In this respect, it was found that interacting a solution of PAA alone (instead of a mixture of PAA with either PVP or PEOx) with an electrolyte solution of 8-12% PVA/55% zinc chloride resulted in the precipitation of small solid PAA fragments rather than a formation of a continuous film. This phenomenon can be attributed to the heat that develops upon mixing the two solutions, which affects the solubility of PAA in the formed interfacial solution. Since PAA was found soluble in 55% $ZnCl_2$ only at a temperature higher than 40° C., it is assumed that contacting the two solutions results first in an exothermic interaction, which is followed by the precipitation of PAA and prevents a spontaneous precipitation of a continuous film. As an example of a cross-linking chemical reaction which can be used to self-form an interfacial porous separator layer between positive and negative pole layers, one can consider the chemical cross-linking polymerization of acrylamide by bis(acrylamide) in the presence of TEMED (tetramethylethylenediamine) and with ammonium persulfate used as an activator for the cross-linking reaction. The overall concentration of the formed poly(acrylamide) and the relative concentration of acrylamide versus bis(acrylamide) can be used to dictate the overall porosity of the formed gel or polymer precipitate.

Thus, using the interactions described hereinabove, an interfacial porous separator layer can be self-formed by interacting one pole layer with another pole layer, where the layers include the solutions described and exemplified hereinabove so as to form the gel or polymer precipitate at the interface thereof. Optionally, the pole layers can interact at both sides of another layer interposed therebetween where each of the layers include solutions that interact as described and exemplified hereinabove so as to form two gels or polymer precipitates which integrate with time to form a single self-formed interfacial porous separator layer.

As seen in FIG. 2, electrochemical cell 50 may also include negative 77 and positive 87 terminals, which are in electrical contact with the corresponding pole layers 52 and 54, respectively. Terminals 77 and 87 are made of any suitable materials such as, but not limited to, graphite or metals such as iron, nickel, titanium, copper, stainless steel and mixtures thereof, and are preferably applied to cell 50 by a suitable printing or lithography technology.

These terminals are used to electrically connect the electrochemical cell to a load such as an electrical device. The terminals may be located in any desired location of the cell, and may have any suitable shape and size. Depending upon the specific application, the terminals may protrude from the surface and dimensions of the cell.

As is further shown in FIG. 2, cell 50 may further include at least one externally located adhesive backing 79, which enables attaching the cell to various surfaces. Cell 50 may also include at least one externally located protective layer 90 to physically protect all other layers.

The self-formed interfacial separator layer of the present invention offers two major advantages as is compared to the prior art. First, in preferred embodiments, the assembling of only two layers is required, whereas the third layer (the separator) spontaneously self-forms therebetween. Second, as the separator self-forms it results in optimal and intimate interaction with the pole layers at the microscopic level, which assures even and efficient ionic conductivity throughout the cell geometry. An inherent advantage of the self-formed separator of the invention is that by selecting the ingredients used for its formation one can control its thickness, porosity, adhesiveness, etc., so as to control the structural and electrical properties of the cell thus formed.

It is appreciated that certain features of the invention, which are, for clarity, described in the context of separate embodiments, may also be provided in combination in a single embodiment. Conversely, various features of the invention, which are, for brevity, describing the context of a single embodiment, may also be provided separately or in, any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method of forming a coplanar electrochemical cell, the method comprising:
    (a) applying a layer of positive pole onto a first substrate;
    (b) applying a layer of negative pole onto the first substrate in spaced relation and in the same plane as the positive pole;
    (c) applying a layer of first electrolyte on and between the layers of spaced apart negative pole and positive pole, wherein the first electrolyte comprises at least one self-forming separator layer ingredient;
    (d) applying a layer of second electrolyte on a second substrate, wherein the second electrolyte comprises at least one self-forming separator layer ingredient; and
    (e) contacting the first substrate and the second substrate readily facilitating interaction between the at least one self-forming separator layer ingredient in the first substrate and second substrate layers to self-form an interfacial separator layer.

2. The method of claim 1, wherein said applying is done by a technique selected from the group consisting of printing, spraying, coating and dispensing and a combination thereof.

3. The method of claim 1, further comprising applying positive and negative current conductors.

4. The method of claim 1, further comprising applying a sealing ingredient onto at least one of the first and second substrates.

5. A method of forming an electrochemical cell, the method comprising contacting a first substrate with a second substrate, wherein the first substrate comprises (a) a negative pole and a positive pole in spaced relation and in the same plane as each other; and (b) a first electrolyte; and wherein the second substrate comprises a second electrolyte and wherein contacting the first substrate with the second substrate facilitates components in an electrolyte solution in the first substrate and components in an electrolyte solution in the second substrate to interact and/or react with each other and self-form an interfacial separator layer.

6. An electrochemical cell comprising:
    a negative pole and a positive pole spaced apart and disposed in the same plane;
    an electrolyte layer comprising a first electrolyte solution and a second electrolyte solution; and
    an integral and in-situ formed interfacial separator layer interposed on and between the negative pole and the positive pole within the electrolyte layer,
    wherein said integral and in-situ formed interfacial separator layer comprises a product of interaction and/or reaction of components in the first electrolyte solution disposed on and between the negative pole and the positive pole and components in the second electrolyte solution, and
    wherein there is no separately added separator.

7. A coplanar electrochemical cell comprising
    (a) a layer of positive pole and negative pole in spaced apart relation in the same plane;
    (b) at least one electrolyte disposed on the layer of positive pole and negative pole and between the negative pole and the positive pole; and
    (c) a self-formed separator, self-formed in situ.

8. The coplanar electrochemical cell of claim 7, further comprising a first substrate and a second substrate.

9. The coplanar electrochemical cell of claim 8, wherein the at least one electrolyte comprises a first electrolyte disposed on the first substrate and a second electrolyte disposed on the second substrate.

10. The coplanar electrochemical cell of claim 9, wherein the first electrolyte comprises a first self-formed separator ingredient, and the second electrolyte comprises a second self-formed separator ingredient, and wherein contact between the first and second substrates facilitates reaction and/or interaction between the first self-formed separator ingredient in the first electrolyte and the second self-formed separator ingredient in the second electrolyte to form the self-formed separator.

11. The coplanar electrochemical cell of claim 10, wherein the first self-formed separator ingredient is a polymer solution and the second self-formed separator ingredient is a polymer precipitating agent.

12. The coplanar electrochemical cell of claim 10, wherein the first self-formed separator ingredient is a polymer solution and the second self-formed separator ingredient is an electrostatic cross-linking agent.

13. The coplanar electrochemical cell of claim 10, wherein the first self-formed separator ingredient is a first polymer solution and the second self-formed separator ingredient is a second polymer solution.

14. The coplanar electrochemical cell of claim 10, wherein the first self-formed separator ingredient is a polymerizable unit and the second self-formed separator ingredient is a polymerization activator.

15. The coplanar electrochemical cell of claim 10, wherein the second electrolyte is disposed on the first electrolyte.

16. The coplanar electrochemical cell of claim 10, wherein the self-formed separator forms between the first electrolyte and the second electrolyte.

17. The coplanar electrochemical cell of claim 7, wherein the self-formed separator is a gel or polymer precipitate.

* * * * *